United States Patent [19]

Neal

[11] 4,089,779
[45] May 16, 1978

[54] CLARIFICATION PROCESS
[75] Inventor: John A. Neal, Bellingham, Wash.
[73] Assignee: Georgia-Pacific Corporation, Portland, Oreg.
[21] Appl. No.: 634,832
[22] Filed: Nov. 24, 1975
[51] Int. Cl.² .................................................. C02B 120
[52] U.S. Cl. ........................................ 210/42 S; 210/47; 210/54
[58] Field of Search ............... 210/42S, 54, 42 R, 47, 210/49, 53; 252/62.51, 62.52, 62.53, 62.54

[56] References Cited
U.S. PATENT DOCUMENTS

| | | | |
|---|---|---|---|
| 3,470,148 | 9/1969 | Allan | 210/54 |
| 3,622,510 | 11/1971 | Felicetta et al. | 210/54 |
| 3,697,420 | 10/1972 | Blaisdell et al. | 210/42 S |
| 3,823,127 | 7/1974 | Jones et al. | 210/42 S |
| 3,923,651 | 12/1976 | Weiss et al. | 210/42 S |
| 4,018,691 | 4/1977 | Neal | 252/62.54 |
| 4,019,995 | 4/1977 | Briggs et al. | 252/62.53 |

Primary Examiner—Thomas G. Wyse
Attorney, Agent, or Firm—Peter P. Chevis

[57] ABSTRACT

A process is described for clarification of an aqueous liquid by imparting magnetic characteristics to flocculated particles by addition of a ferromagnetic organic composition to the liquid to associate the ferromagnetic composition with the flocculated particles.

13 Claims, No Drawings

CLARIFICATION PROCESS

This invention pertains to an improved process for clarification of an aqueous liquid using an insoluble metal hydroxide as a flocculant. More particularly, it pertains to clarification of aqueous liquids by imparting magnetic characteristics to particles flocculated by the insoluble metal hydroxide to enhance the separation of the flocculated particles from the treated liquid.

Considerable amount of effort has been expended and is being expended by industry and others in clarification of aqueous liquids or effluents containing finely dispersed particles. Many aqueous liquids contain particles of colloidal dimension which may not be effectively removed or separated to the extent required to meet pollution regulations by simple filtration or flocculation. In many systems, the finely dispersed material may be successfully flocculated with insoluble metal hydroxides. Generally the metal hydroxide is formed in situ and is a voluminous, gelatinous precipitate which is not readily separable from the liquid. Usually settling ponds, or clarifiers and thickeners must be employed requiring large land area which normally is of limited availability in industrial areas where the effluent is generated. Thus, a process which will eliminate the need of clarifiers or thickeners or enhance the rate of settlement of the floc to increase the capacity of these units is greatly desired.

It is therefore an object of this invention to provide a process for the clarification of an aqueous liquid. A further object is to provide a process for clarification of an aqueous liquid by flocculating the finely divided particles in the liquid into a floc having magnetic properties and employing a magnetic field to enhance the settlement or separation of the magnetic flocs from the liquid. A still further object is to enhance the settlement or separation of contaminants flocculated with a water-insoluble metal hydroxide by imparting magnetic characteristics to the flocculated particles or floc and separating the flocculated particles by use of a magnetic field. Another object is to provide a flocculating agent having magnetic properties to impart magnetic characteristics to flocculated particles.

The above and other objects of this invention are attained by adding to an aqueous liquid flocculated with a metal hydroxide, a water-soluble ferromagnetic lignosulfonate, ferromagnetic sulfonated tannin, or a ferromagnetic sulfonated phenol condensed with an aldehyde. The ferromagnetic composition is added in conjunction with an insoluble metal hydroxide flocculating agent or compound added for the formation of the insoluble metal hydroxide to flocculate the finely divided particles in the liquid. The ferromagnetic organic composition becomes associated or combined with the floc or flocculated particles to impart magnetic characteristics to the particles. The flocculated contaminants may then be removed from the liquid by using a magnetic filter or by settling in the presence of a magnetic field which will considerably increase the rate of settlement.

It is surprising to find that the ferromagnetic organic compositions, while being water-soluble, will become associated or in some manner combined with the flocculated particles and be removed from solution. The mechanism by which the organic ferromagnetic compositions become combined or associated with flocculated particles is not definitely known. It is believed that the ferromagnetic organic composition in some manner becomes combined or associated with the metal hydroxide particles and is thus carried down or incorporated in the floc. However, the term "combined" or "associated" as used herein in this regard is intended to mean that magnetic properties are imparted to the floc by the ferromagnetic organic composition without regard to the mechanism or chemical reaction involved.

The ferromagnetic organic compositions may be conveniently prepared by dissolving an iron compound and a lignosulfonate, sulfonated tannin or sulfonated phenol-aldehyde in water, adding 1 equivalent of alkali per equivalent of iron, and reacting the mixture in a manner to permit the formation of magnetite or other magnetic oxides of iron. The iron compound is dissolved in the water in an amount at least twice the stoichiometric amount of iron, expressed as ferric iron, necessary for reaction with the sulfonate groups of the lignosulfonate, sulfonated tannin, or the sulfonated phenol condensation product. Usually a change in the oxidation state of the iron may be required in the presence of the alkali to obtain the iron in both the ferric and ferrous states in the desired proportions, i.e., approximately those present in magnetite. When a ferrous iron compound is used, the reaction of the iron with the lignosulfonate or the other sulfonated products is normally carried out by heating the mixture with agitation in air or under other relatively mild oxidizing conditions sufficient to oxidize a portion of the ferrous iron without substantial oxidation or degradation of the lignin or other sulfonated products. When a mixture of ferrous and ferric iron compounds in the proper proportion to obtain magnetite is added to the heated solution at a suitable pH, the oxidation is not necessary and the ferromagnetic compositions may be obtained upon heating the mixture with sufficient alkali. The composition obtained, having an iron content of from 9 to 45, preferably in the range of 15 to 35 weight percent, has the magnetic iron oxide or iron hydroxide bound to the lignosulfonate, sulfonated tannin, or sulfonated phenol aldehyde condensation product in some manner to give a ferromagnetic composition having magnetic susceptibility, based upon the iron content, in the range of magnetite. When dissolved in water, the organically based ferromagnetic composition has the characteristic of a polyelectrolyte solution and no separation of the reacted iron from the lignosulfonate, sulfonated tannin, or the sulfonated phenol condensation product can be obtained by filtration, centrifugation or by gel permeation chromatography. Since the organically based ferromagnetic compositions have properties of a polyeletrolyte solution, the use of these solutions of the ferromagnetic compositions under the varying conditions obtained in emulsions or water-organic liquid mixtures will not affect the magnetic properties of the solution. The ferromagnetic composition solution im combining with the water or water-miscible particles will maintain its magnetic susceptibility and be removed without the magnetic constituents separating from the aqueous phase as may be obtained with dispersions of magnetite or other magnetic particles in an aqueous solution. Other methods for the preparation of these ferromagnetic compositions and properties thereof are described in more detail in patent applications Ser. No. 439,579 filed Feb. 4, 1974, now abandoned and Ser. No. 630,071 filed Nov. 7, by William Scott Briggs et al., now U.S. Pat. No. 4,019,995, and patent application Ser. No. 608,462 filed Aug. 28, 1975, by John A. Neal, now U.S. Pat. No. 4,018,691, which we incorporated herein by reference.

As disclosed in the above references, lignosulfonates and sulfonated tannins from any source may be used in preparation of the ferromagnetic composition. When spent sulfite liquors or sulfite digestion products of bark are used as the lignosulfonate or sulfonated tannin source, generally the products are purified to some extent to partially remove the low-molecular weight organic and non-lignin constituents such as sugars and sugar carboxylic acids.

The condensation of a sulfonated phenol and aldehyde may be effected through the various known methods for condensation of phenols with aldehydes. Generally the impurities which may be present in the product prepared by most of the processes are not present at a level that is detrimental. A convenient method for preparation of the condensation product of a sulfonated phenol and aldehyde is to sulfonate the phenol with sulfuric acid and then react the sulfonated phenol with aldehyde similar to that described in U.S. Pat. Nos. 2,681,312 and 3,214,373. Preferably the monohydric phenols are used which are preferably sulfonated to the extent to obtain a predominantly monosulfonated phenol. The sulfonated phenols are condensed with aldehydes having up to 6 carbon atoms to the extent that a high-molecular weight product is obtained which is still water-soluble.

The amount of the ferromagnetic organic composition added may be widely varied depending upon the organic composition used, system being treated, and the strength of the magnetic field used in the separation. Generally, the ferromagnetic organic composition is added in amounts such that the magnetic composition is associated with the particles or floc in an amount to impart sufficient magnetization to the particle to be attracted by the magnetic field being used to effect or aid in the separation. The ferromagnetic or organic compositions may be prepared having various magnetizations or attractive force to a magnetic field. Thus, a product having a higher magnetization may be used in lesser amounts than a product which has a lower attractive force. Also, the ferromagnetic organic compositions used are water-soluble and in some systems only a portion of the added material may become associated with the floc. Generally, the ferromagnetic organic compositions used may contain from about 18 to 30 percent iron and have a magnetization or are attracted by a magnetic field to the extent of from about 30% of magnetite up to the attractive force of magnetite based upon the weight of the material. Generally, the amount of the ferromagnetic composition used is such that the ferromagnetic composition will be associated with the flocculated particles to the extent that the iron of the ferromagnetic composition added represents from about 0.5 to 20 percent of the metal content of the flocculating agent. When used in this amount, significant magnetic characteristics, e.g., an attractive force of about at least 0.02 grams per gram on a dry basis, are imparted to the particle or floc to be relatively effective in magnetic fields of strengths which may normally be used in magnetic filtration and other methods of separation. Obviously, lesser amounts may be used with stronger magnetic fields employed in the separation. At times it may be more economical to use larger amounts of the ferromagnetic composition and employ lower magnetic fields in the separation and at other times the reverse may be true.

While iron and aluminum hydroxide are the most commonly used flocculants for most aqueous systems, the other heavy metal hydroxides and other insoluble or substantially insoluble metal hydroxides, for example, alkaline earth metal hydroxides, are operative and may be used in special situations. Most of these metal hydroxides form gelatinous, hydrogel-type products or precipitates which are effective in flocculation or bring down other finely dispersed particles. The dispersed particles may be colloidal, bacteria, and even contaminants which may be considered as dissolved, such as phosphates and nitrates may be adsorbed, precipitated, or otherwise carried down by the hydroxide floc. Illustrative examples of the hydroxides of metals in addition to iron and aluminum which may be used are magnesium, manganese, cobalt, nickel, copper, zinc, calcium, and others forming insoluble hydroxides. Generally, the flocculating agent is added to the aqueous liquid or effluent as a soluble salt or compound with the conditions of the aqueous liquid or effluent being controlled to form the insoluble hydroxide in situ. The most commonly used flocculating agents, iron hydroxide and aluminum hydroxide, are generally obtained by addition of water-soluble salts of aluminum or iron such as alum or aluminum sulfate, iron chloride, or iron sulfate to the effluent under conditions to form the hydroxide. The ferromagnetic organic composition may be added to the aqueous liquid at the same time with the flocculant forming compound, or before or after the addition of the flocculating compound. Likewise, it is immaterial as to whether the ferromagnetic composition is present at the time of the metal hydroxide formation. It may be added after the addition of the flocculating agent and the formation of the insoluble hydroxide in situ. Generally, substantially all of the organic composition added becomes associated with the floc when used in the amounts generally added, especially with the iron and aluminum flocculants, so that the contamination of the aqueous liquid or effluent by the remaining magnetic organic composition is minimized. For convenience, the ferromagnetic organic composition may be intermixed with a water-soluble compound of the flocculating agent in a dry form prior to addition to the aqueous fluid containing the dispersed particles. In this manner, the ratio of the magnetic organic composition used and flocculating agent can be adjusted to obtain floc having the required magnetic properties to be effectively separated in the magnetic field used in the separation. Likewise, the ferromagnetic composition may be associated or combined with the metal hydroxide to form a magnetic floc prior to addition of the mixture to the aqueous liquid. The ferromagnetic composition may be added to a slurry of the metal hydroxide or the pH of a solution of the ferromagnetic composition and a compound of the flocculating metal altered to obtain the metal hydroxide combined with the magnetic composition. The precombined mixture or magnetic floc is generally added to the aqueous effluent as a slurry, since drying of the mixture may reduce the effectiveness.

Any of the various known magnetic separation equipment and processes may be used for the settlement or separation of the magnetized particles from the liquid. Magnetic filtration type equipment and processes such as described in U.S. Pat. Nos. 3,567,026; 3,627,678; and 3,770,629; and covered in an article entitled, "High-Gradient Magnetic Separation" in the November, 1975, issue of the *Scientific American* magazine are illustrative of some of the more effective devices and of the effectiveness of magnetic separation on various systems. In these devices, the liquid to be subjected to the magnetic field is passed through a steel wool type packing which is magnetized by a magnetic field to provide a large number of regions of a very high magnetic field gradient. Periodically, the apparatus is demagnetized and flushed with water to remove the magnetic floc or particles which had been retained in the packing subjected to the magnetic field. Also, clarifier or settling type equipment may be used where the liquid is subjected to a magnetic field to increase the settling rate.

The ferromagnetic organic compositions are relatively stable in aqueous solutions from a pH of about 2 to 13 and temperatures up to 230° C and higher which is well within the range of most of the effluents or aqueous liquids which are subjected to clarification and within the conditions used in most clarification or separation processes.

EXAMPLE I

To illustrate the enhancement obtained in settling of iron hydroxide floc by imparting magnetic properties to the floc and using a magnetic field to aid in settling, an aqueous solution of ferric sulfate and a ferromagnetic lignosulfonate was prepared. The ferric sulfate was added in an amount such that the solution contained 200 parts per million of iron. The ferromagnetic lignosulfonate was added in an amount such that the iron content of the lignosulfonate was 11.5 parts per million or about 5.7 percent of the iron content of the ferric sulfate. The pH of the solution of the ferric sulfate containing the ferromagnetic lignosulfonate was raised to pH 8 by addition of sodium hydroxide precipitating the ferric iron as ferric hydroxide. The sample was placed in a container about 1.25 cm deep which was on top of a permanent ceramic magnet. The magnets produced a magnetic field of about 400 gauss at the surface. The ferric hydroxide precipitate containing the magnetic lignosulfonate settled at a rate of 1.5 cm per minute. The same precipitate in absence of the magnetic field settled at a rate of about 0.6 centimeters per minute.

The ferromagnetic lignosulfonate contained 24% iron and exhibited a magnetic attractive force of about 1.25 g/g which was about 48% of the magnetic attractive force obtained with magnetite measured in a magnetic field of about 240 oersteds in a manner similar to that described in Example III below. The ferromagnetic lignosulfonate was prepared by adding ferrous sulfate to a lignosulfonate solution and adding about 1 equivalent of sodium hydroxide for an equivalent of the iron while the mixture was reacted at about 95° with agitation under atmospheric conditions to oxidize a portion of ferrous iron to ferric iron. After the reaction was completed, additional ferrous sulfate was added followed by sodium hydroxide and heating continued.

EXAMPLE II

An aqueous mercury chloride solution was prepared having a mercury concentrate of about 1000 parts per billion which is in the range of mercury concentrations often found in mercury cathode cell effluents. Sodium sulfide was added to the solution to provide approximately 10 parts per million of sulfide ion. The solution was adjusted to pH 7 by addition of sulfuric acid resulting in the precipitation of the mercury as finely divided mercury sulfide. The treated solution was divided into 3 samples of about 400 ml each. One of the samples was filtered through a Whatman #2 filter paper, and an analysis of the filtrate showed that the mercury content in the filtrate to be about the same as that of the original sample.

The second 400 ml sample containing the mercury sulfide suspension was treated with a slurry of aluminum hydroxide-ferromagnetic lignosulfonate product as a flocculating agent which was prepared by dissolving aluminum sulfate and the ferromagnetic lignosulfonate in an aqueous solution in a ratio such that the iron content of the ferromagnetic lignosulfonate was about 4.8% of the aluminum content. The slurry of the aluminum hydroxide-ferromagnetic lignosulfonate was added to the second portion in an amount such that approximately 0.25 grams of aluminum was added. The mixture was then filtered and the filtrate obtained contained only about 10 parts per billion of mercury.

To the third 400 ml sample the aluminum hydroxide-ferro-magnetic lignosulfonate was again used as a flocculating agent but the slurry obtained was first air dried to a dry powder. Upon addition of the dry powder in an amount as above, and filtration of the product, the filtrate obtained contained 420 parts per billion indicating that only about 62 percent of the mercury sulfide was removed, while in the run above the mercury removal was about 99 percent.

EXAMPLE III

The attractive force in a magnetic field of iron and aluminum hydroxide flocs treated with a ferromagnetic lignosulfonate was determined.

A solution of ferric sulfate was prepared which contained about 2.1 grams of ferric ion. To this solution about 2 ml of a solution of a ferromagnetic lignosulfonate were added. The ferromagnetic lignosulfonate contained about 22.2 percent iron, and the 2 ml of the ferromagnetic lignosulfonate solution contained 0.0544 grams of iron so that the iron in the ferromagnetic lignosulfonate represented about 2.6 percent of the iron content of the ferric sulfate. Dilute sodium hydroxide was added to the solution until the pH of the solution was about 8. The resulting precipitate obtained was collected and dried to yield about 4.1 grams of product.

A second run was made similar to that above except that 4 ml of the ferromagnetic lignosulfonate solution were added so that the metal content of the amount of the ferromagnetic lignosulfonate represented about 5.2 percent of the iron content of the iron sulfate. Upon drying of the precipitate obtained, 4.7 grams of product were obtained.

A third run was made similar to that above using 4 ml of the ferromagnetic lignosulfonate solution except that the pH was lowered prior to drying. After the addition of the ferromagnetic lignosulfonate solution to the ferric sulfate solution, the pH was adjusted to pH 8 by addition of dilute sodium hydroxide and the product was permitted to set overnight. The water was then decanted, and more water was added to the precipitate with the addition of sulfuric acid to obtain a pH of 3.6. The mixture at pH 3.6 was stirred, settled, and then decanted and the precipitate dried to yield 4.7 grams of dry product. The magnetic attractive forces of the three dried products were determined using a procedure similar to that described by D. F. Evans in the Journal of Chemical Society (A), London, 1967, 1670. In the procedure, two similar magnets were fixed in position on the pan of an analytical balance with the north pole of one of the magnets facing the south pole of the other. The pole faces of each of the magnets were square having a dimension of 2.5 cm on edge. The magnets were placed with a pole gap of 3.3 cm at the bottom and 3.5 cm at the top. In determining the magnetization or the magnetic attractive force, the product was ground into a fine uniform powder and packed into a Pyrex test tube of the type normally used for nuclear magnetic resonance measurements having an inside diameter of 4 mm. The sample tube was rigidly fixed between and near the top of the two magnets so that the top of the sample in the test tube was about 5 mm below the top of the magnets. The magnetization or attractive force was obtained by noting the change in weight of the magnets in the presence of the sample. Samples of about 0.015 grams were tested which filled the test tube to a height of about 3 to 4 mm. The magnetization or attractive force was determined by dividing the change in weight of the magnets obtained by the weight in grams of the product in the test tube. The strength of the magnetic field in the area of the sample was about 240 oersteds. The attractive forces obtained for the samples from the three ovens were 0.08, 0.11, and 0.14 g/g, respectively. These values are in substantial agreement with the attractive forces calculated assuming that all of the ferromagnetic lignosulfonate added had become associated with the iron hydroxide. The magnetic attractive force of the ferromagnetic lignosulfonate measured in the manner described above was 1.2 grams per gram.

In the manner similar to that described above the magnetic attractive force of aluminum hydroxide treated with the ferromagnetic lignosulfonate was likewise determined. To a solution containing approximately 0.81 grams of aluminum as aluminum sulfate, two milliliters of the ferromagnetic lignosulfonate solution were added. The two milliliters of the magnetic lignosulfonate contained 0.0544 grams of iron which was about 6.7 percent of the aluminum content of the aluminum sulfate. The pH of the solution was adjusted to about 6.5 with dilute sodium hydroxide, thereby precipitating the aluminum as aluminum hydroxide. The precipitate was collected and dried to give about 4.2 grams. The magnetic attractive force of the product measured in the manner described above was 0.07 grams per gram which was approximately the magnetic attractive force which would be calculated assuming that substantially all of the added ferromagnetic lignosulfonate became associated with the aluminum hydroxide. Similarly, the ferromagnetic lignosulfonate became associated with the aluminum hydroxide when the aluminum sulfate was raised to a pH of about 11.5 with sodium hydroxide prior to the addition of the ferromagnetic lignosulfonate and acidification to pH 6.5.

To illustrate the extent of association obtained between a ferromagnetic lignosulfonate and aluminum hydroxide, a 1 liter solution of aluminum sulfate was prepared containing 500 parts per million of aluminum. To this solution, sodium hydroxide was added until the solution was at pH 5 thus producing an insoluble aluminum hydroxide floc. To this suspension, the ferromagnetic lignosulfonate of Example I was added in an amount of 100 parts per million which represented the addition of iron such that the solution contained about 24 parts per million of iron. The suspension of aluminum hydroxide with the ferromagnetic lignosulfonate was allowed to settle and a sample of the supernatant liquid obtained was analyzed for iron and found to contain only 0.14 parts per million of iron which indicated that less than 1 percent of the iron or of the ferromagnetic lignosulfonate remained in solution.

What is claimed is:

1. In a process for clarification of an aqueous liquid wherein dispersed particles are flocculated with an insoluble metal hydroxide, the improvement which comprises adding to the liquid a water-soluble ferromagnetic organic composition selected from the group consisting essentially of ferromagnetic compositions of lignosulfonate, sulfonated tannin, and sulfonated phenol condensed with an aldehyde to associate the ferromagnetic organic composition with the metal hydroxide flocculated particles, said ferromagnetic organic composition being prepared by dissolving an iron compound in an aqueous solution of the lignosulfonate, sulfonated tannin, or sulfonated phenol condensed with an aldehyde in an amount at least twice the stoichiometric amount to react with the sulfonate groups and reacting the mixture under conditions for the formation of magnetic iron oxide in the presence of an alkali and having the iron present in ferrous and ferric states, and separating the particles from the treated liquor in the presence of a magnetic field, said ferromagnetic organic composition being added to the liquid in an amount such that the amount of the ferromagnetic composition associated with the flocculated particles imparts a sufficient magnetization to the flocculated particles for the flocculated particles to be attracted by the magnetic field.

2. A process according to claim 1 wherein the ferromagnetic organic composition is added in an amount such that the metal content of the ferromagnetic composition is from 0.5 to 20 percent of the metal content of the flocculant.

3. A process according to claim 2 wherein the ferromagnetic organic composition is a ferromagnetic lignosulfonate.

4. A process according to claim 1 wherein the flocculating agent is an aluminum hydroxide or iron hydroxide.

5. A process according to claim 4 wherein the flocculating agent is added as a water-soluble salt under conditions to form the insoluble metal hydroxide in the aqueous liquid.

6. A process according to claim 4 wherein the ferromagnetic organic composition is added in an amount such that the metal content of the ferromagnetic composition is from 0.5 to 20 percent of the metal content of the flocculating agent.

7. A process according to claim 6 wherein the ferromagnetic organic composition is a ferromagnetic iron lignosulfonate.

8. A process according to claim 7 wherein the ferromagnetic lignosulfonate is added to the aqueous liquid as a mixture with a water-soluble salt forming the insoluble metal hydroxide in the aqueous liquid.

9. A process according to claim 8 wherein the flocculated particles associated with the ferromagnetic organic composition are separated from the liquid by use of a magnetic filter.

10. A process according to claim 7 wherein the flocculating agent is aluminum hydroxide.

11. A process according to claim 7 wherein the flocculating agent is iron hydroxide.

12. A process according to claim 4 wherein the ferromagnetic organic composition is added in an amount to impart a magnetic attractive force to the flocculating particles of at least 0.02 grams per gram of the flocculated particles on a dry basis.

13. A process according to claim 12 wherein the ferromagnetic organic composition is a ferromagnetic iron lignosulfonate.

* * * * *